(12) United States Patent
Hoffmann et al.

(10) Patent No.: US 11,802,541 B2
(45) Date of Patent: Oct. 31, 2023

(54) METHOD FOR PRODUCING A SPLIT ROTOR BLADE, AND ROTOR BLADE

(71) Applicant: Wobben Properties GmbH, Aurich (DE)

(72) Inventors: Alexander Hoffmann, Emden (DE); Harro Harms, Wiesmoor (DE); Albrecht Brenner, Aurich (DE)

(73) Assignee: Wobben Properties GmbH, Aurich (DE)

( * ) Notice: Subject to any disclaimer, the term of this patent is extended or adjusted under 35 U.S.C. 154(b) by 57 days.

(21) Appl. No.: 16/969,398

(22) PCT Filed: Jan. 22, 2019

(86) PCT No.: PCT/EP2019/051519
§ 371 (c)(1),
(2) Date: Aug. 12, 2020

(87) PCT Pub. No.: WO2019/158324
PCT Pub. Date: Aug. 22, 2019

(65) Prior Publication Data
US 2021/0054822 A1 Feb. 25, 2021

(30) Foreign Application Priority Data
Feb. 14, 2018 (DE) ..................... 10 2018 103 344.3

(51) Int. Cl.
*F03D 1/06* (2006.01)
(52) U.S. Cl.
CPC ........ *F03D 1/0675* (2013.01); *F05B 2230/23* (2013.01); *F05B 2240/302* (2013.01);
(Continued)

(58) Field of Classification Search
CPC . F03D 1/0675; F03D 1/0633; F05B 2240/302
See application file for complete search history.

(56) References Cited

U.S. PATENT DOCUMENTS

| 4,474,536 A | 10/1984 | Gougeon et al. |
| 7,334,989 B2 * | 2/2008 | Arelt ..................... F03D 1/0675 |
| | | 416/229 R |

(Continued)

FOREIGN PATENT DOCUMENTS

| CN | 102308083 A | 1/2012 |
| CN | 105473847 A | 4/2016 |

(Continued)

*Primary Examiner* — Topaz L. Elliott
*Assistant Examiner* — Michael K. Reitz
(74) *Attorney, Agent, or Firm* — SEED INTELLECTUAL PROPERTY LAW GROUP LLP

(57) ABSTRACT

A method for producing a split rotor blade, a method for connecting a split rotor blade, a rotor blade, a rotor blade segment, a rotor, a wind power plant, and a production device for producing rotor blades. A method for producing a split rotor blade, comprising: providing a rotor blade having a spar cap and an extension in the longitudinal direction from a blade root region to a blade tip; making at least one groove in the spar cap, the groove being arranged in a first connection region of the rotor blade, and a portion of the main extension direction of the groove being oriented parallel to the longitudinal direction; splitting the rotor blade, in the first connection region, into a rotor blade section facing the blade root and a rotor blade section facing away from the blade root, a first groove section being arranged in the rotor blade section facing the blade root and a second groove section being arranged in the rotor blade section facing away from the blade root.

13 Claims, 10 Drawing Sheets

(52) U.S. Cl.
  CPC ....... *F05B 2250/11* (2013.01); *F05B 2250/12* (2013.01); *F05B 2250/131* (2013.01); *Y10T 403/55* (2015.01)

(56) References Cited

U.S. PATENT DOCUMENTS

| | | | |
|---|---|---|---|
| 2012/0070296 A1 | 3/2012 | Klein et al. | |
| 2012/0082554 A1 | 4/2012 | Baker et al. | |
| 2012/0141286 A1* | 6/2012 | Kyriakides | F03D 1/0675 416/233 |
| 2012/0213642 A1 | 8/2012 | Wang et al. | |
| 2013/0129518 A1* | 5/2013 | Hayden | B29C 70/40 416/226 |
| 2013/0224032 A1* | 8/2013 | Busbey | F03D 1/0633 416/223 R |
| 2013/0323068 A1 | 12/2013 | Petellaz | |
| 2015/0226180 A1 | 8/2015 | Grove-Nielsen | |
| 2016/0281680 A1 | 9/2016 | Randall | |
| 2016/0341177 A1 | 11/2016 | Bech et al. | |
| 2017/0122287 A1* | 5/2017 | Dobbe | B29C 66/00145 |
| 2017/0268482 A1 | 9/2017 | Beyland et al. | |
| 2018/0171968 A1* | 6/2018 | Hunter | F03D 1/0675 |
| 2019/0136828 A1* | 5/2019 | Hancock | F03D 1/0675 |

FOREIGN PATENT DOCUMENTS

| | | |
|---|---|---|
| CN | 105952580 A | 9/2016 |
| DE | 102010046519 A1 | 3/2012 |
| DE | 102014206670 A1 | 10/2015 |
| DE | 102014118004 B3 | 3/2016 |
| EP | 2669192 A1 | 12/2013 |
| EP | 2740583 A1 | 6/2014 |
| EP | 2930352 A1 | 10/2015 |
| WO | 2016/189092 A1 | 12/2016 |
| WO | 2016/198075 A1 | 12/2016 |

* cited by examiner

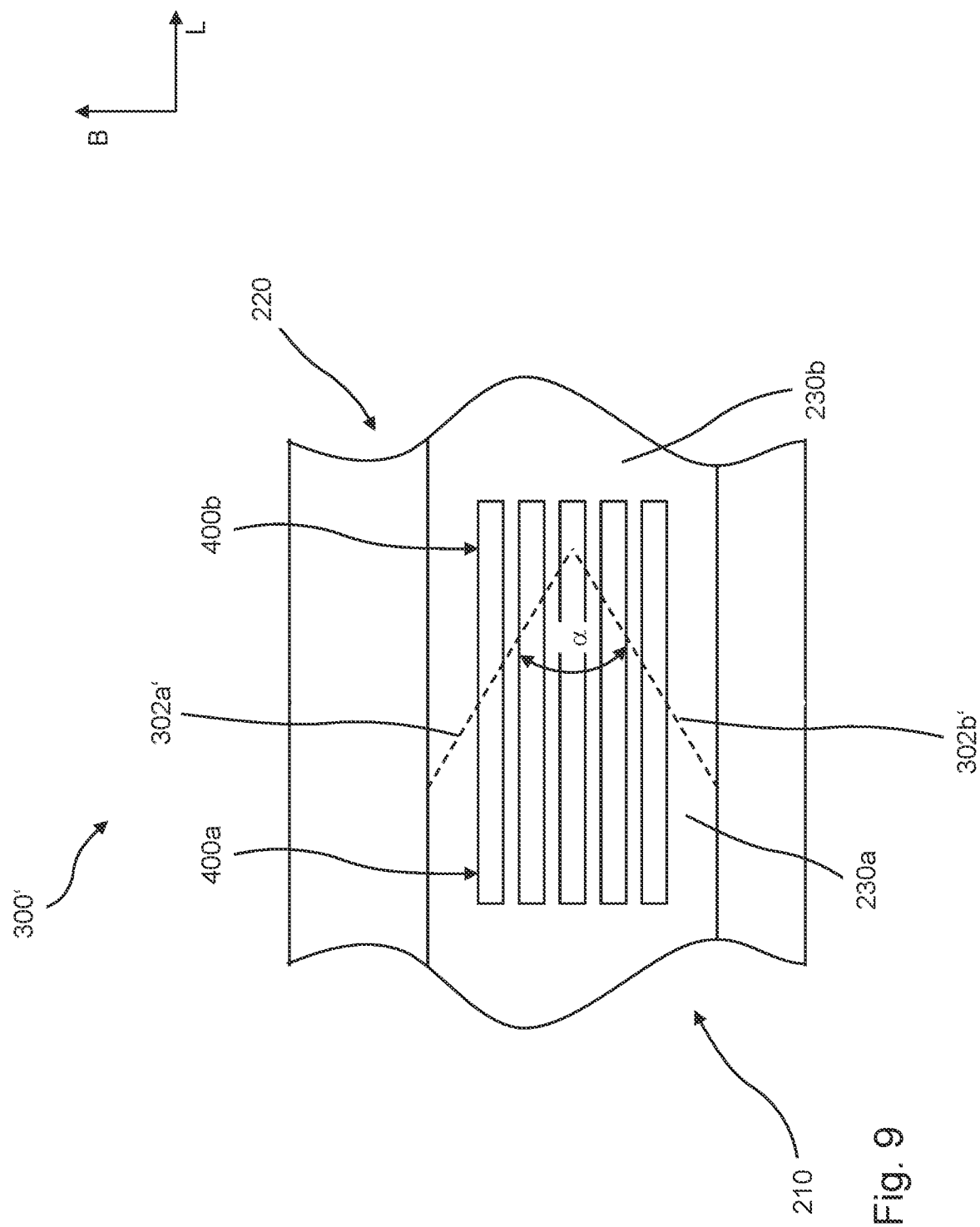

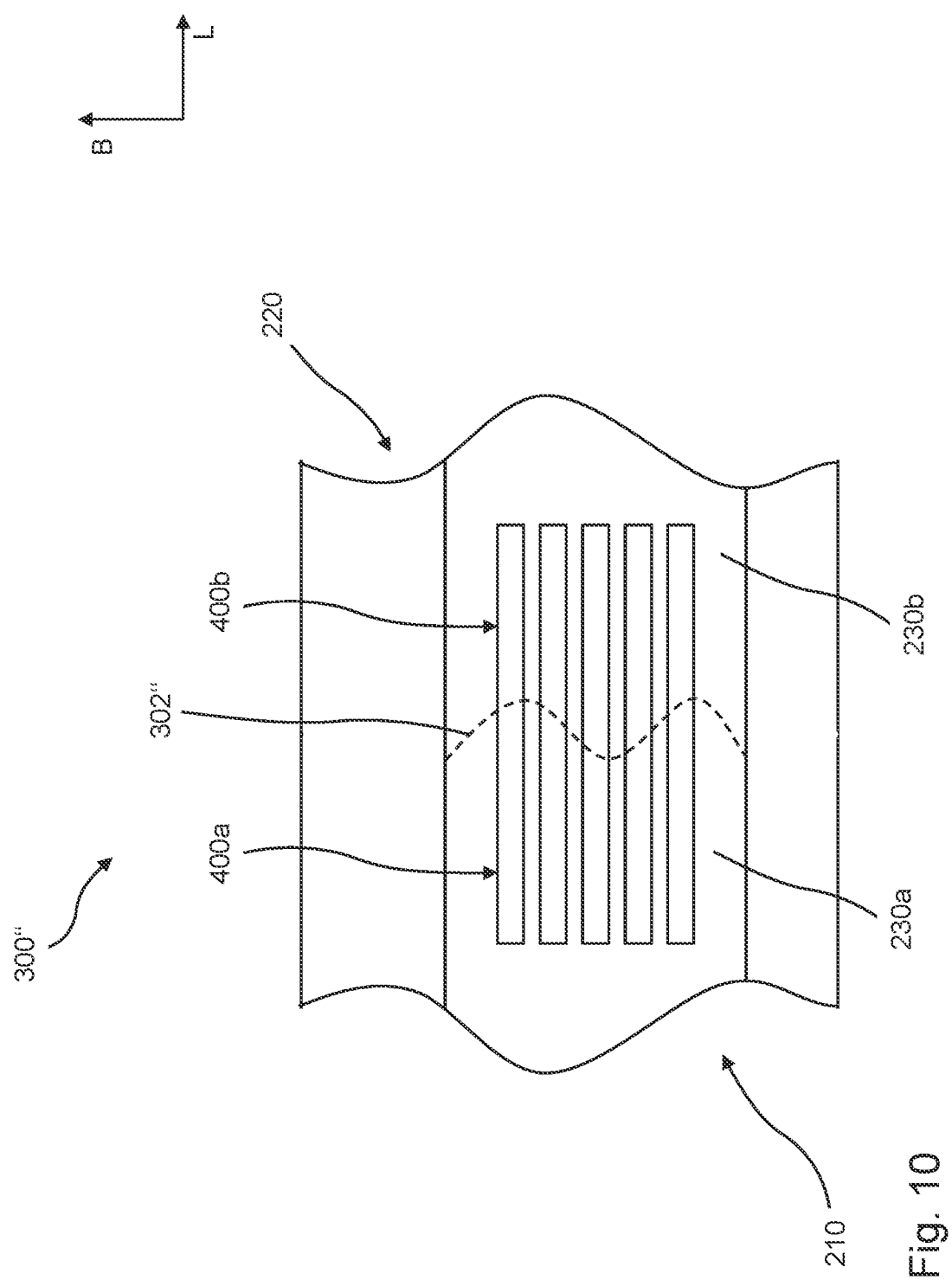

METHOD FOR PRODUCING A SPLIT ROTOR BLADE, AND ROTOR BLADE

BACKGROUND

Technical Field

The invention relates to a method for producing a split rotor blade, a method for connecting a split rotor blade, a rotor blade, a rotor blade segment, a rotor, a wind power installation, and a production system for producing rotor blades.

Description of the Related Art

Wind power installations of the type stated at the outset are sufficiently well known. The most common type of wind power installation at the present time is the "horizontal-axis" wind power installation, which is usually equipped with three rotor blades, although wind power installations with one, two, four or more rotor blades are also possible. Wind power installations of this kind are of increasingly larger construction in order, on the one hand, to be able to achieve a higher rated power and, on the other hand, to allow better utilization of wind, the ultimate aim being to increase the economy of wind power installations.

Larger designs of wind power installations can have greater hub heights or larger rotor diameters, for example. Consequently, wind power installations of this kind may have larger generators and/or larger feed-in power ratings. However, the larger rotor diameters, in particular, also result, in very general terms, in larger forces and torques on the wind power installation. The larger forces are caused by the larger centrifugal forces of the longer rotor blades, for example.

Owing to these larger forces and/or torques, the main components of a wind power installation, e.g., the spar caps within a rotor blade, are, on the one hand, given dimensions that are larger or suitable for higher loads, and, on the other hand, further components, e.g., fastening elements, are also given dimensions that are larger or suitable for higher loads.

Since rotor blades generally have to be transported from a production site to an erection site of the wind power installation and must be fitted to the hub there, the use of split rotor blades is often necessary or advantageous, especially in the case of rotor blades with a long length. Split rotor blades, i.e., those which have at least two parts in the longitudinal direction, are known from DE 10 2014 206 670 A1, for example. Split rotor blades may be required if transportation to the erection site is to be possible at all, particularly in the case of erection sites in wooded areas or mountainous regions.

Owing to the larger sizes of wind power installations and the increase in the size of the individual rotor blades which is often associated therewith, the forces and/or torques within a rotor blade are also generally increased. The connection between a first rotor blade section and a second rotor blade section and/or further rotor blade sections must therefore generally be designed with a disproportionately greater use of materials than would be necessary with smaller rotor blades.

The connection point between two rotor blade sections is a critical region of a rotor blade. Since the otherwise continuous components that determine strength, e.g., the spar caps or the webs, are split here, this location must be reinforced in some other way. Consequently, the connection region between two rotor blade sections is configured in such a way, by extensive technical measures, that the required strength can be ensured. It is possible, for example, for two rotor blade sections to be connected to one another by a multiplicity of longitudinal bolts and transverse bolts. However, the conventional technical measures for connecting rotor blade sections are expensive and, inter alia, result in a higher rotor blade weight. The connection points of spar caps may extend over 8 meters, for example, owing to the generally unidirectional fiber direction. Moreover, the conventional measures are high-maintenance since bolted joints, for example, have to be checked at regular intervals. Consequently, two- or multi-part rotor blades generally have a higher weight than one-piece rotor blades. Known connection methods from the light-weight construction sector, e.g., adhesive bonding, can generally be used only to a limited extent, if at all, since they are deemed to be uneconomical. The lack of economy is due inter alia to high costs and the high time investment for the production of the connection.

The German Patent and Trademark Office searched the following prior art in the priority application of the present application: DE 10 2014 118 004 B3, DE 10 2010 046 519 A1, DE 10 2014 206 670 A1, EP 2740 583 A1.

BRIEF SUMMARY

Provided is a method for producing a split rotor blade, a method for connecting a split rotor blade, a rotor blade, a rotor blade segment, a rotor, a wind power installation, and a production system for producing rotor blades. Provided are techniques that reduce the weight of split rotor blades.

According to a first aspect of the present invention, provided is a method for producing a split rotor blade, comprising providing a rotor blade having a spar cap, and an extent in the longitudinal direction from a blade root region to a blade tip, making at least one groove in the spar cap, wherein the groove is arranged in a first connection region of the rotor blade, and a main direction of extent of the groove preferably has a direction component which is aligned parallel to the longitudinal direction, splitting the rotor blade, in the first connection region, into a rotor blade section facing the blade root and a rotor blade section facing away from the blade root, wherein a first groove section is arranged in the rotor blade section facing the blade root and a second groove section is arranged in the rotor blade section facing away from the blade root.

The blade root region of the rotor blade provided is generally the region of the rotor blade which faces the hub. In particular, the blade root region can be designed in such a way that it can be connected to a hub of a rotor. The blade tip of the rotor blade provided, on the other hand, is the end of the rotor blade which faces away from a hub of a rotor. The rotor blade provided furthermore has the spar cap, wherein the rotor blade can preferably also have two or more spar caps. The spar cap is preferably arranged and designed in such a way that it ensures a strength of the rotor blade in the longitudinal direction. In particular, there is a preference for the rotor blade to have a spar cap on the pressure side and a spar cap on the suction side. In the case of a pressure-side spar cap and a suction-side spar cap, there is furthermore a preference for these two spar caps to be connected by one web or by two or more webs. The spar cap preferably has an elongate geometry aligned parallel to the longitudinal axis of the rotor blade. The spar cap can furthermore have a sheet-like geometry, which is formed by a longitudinal extent of the spar cap in the longitudinal direction of the rotor blade and a spar cap width in the direction of a rotor blade width. The spar cap can furthermore have a spar cap thickness which is aligned orthogonally to the longitudinal extent of the spar cap and orthogonally to the spar cap width. The longitudinal extent of the spar cap and/or the spar cap width are/is preferably a multiple of the extent of the spar cap width.

The rotor blade preferably has a sheet-like extent. The sheet-like extent of the rotor blade is preferably formed by a longitudinal extent of the rotor blade in the longitudinal direction of the rotor blade and by the rotor blade width. Orthogonally to the longitudinal direction and orthogonally to the rotor blade width, the rotor blade preferably has a rotor blade thickness. In the longitudinal direction, the sheet-like extent of the rotor blade has a leading edge, which faces the wind in operation, and a trailing edge, which faces away from the wind in operation.

The rotor blade furthermore has at least one connection region, namely the first connection region. The first connection region is arranged between the blade root region and the blade tip. The first connection region can be arranged on the rotor blade in such a way that the rotor blade section facing the blade root is greater than 10%, greater than 20%, greater than 30%, greater than 40%, greater than 50%, greater than 60%, greater than 70%, greater than 80% or greater than 90% of the longitudinal extent of the rotor blade.

The splitting of the rotor blade into a rotor blade section facing the blade root and a rotor blade section facing away from the blade root takes place in such a way that the at least one groove is also split, into a first groove section in the rotor blade section facing the blade root, and a second groove section in the rotor blade section facing away from the blade root. This has the advantage that, after splitting, the two groove sections are in alignment with one another and can be connected by means of a connection piece. The connection piece for insertion into the groove sections and connecting the groove sections is preferably continuous.

It is furthermore also possible for two or more grooves to be made in the spar cap. These two or more grooves can likewise be split into groove sections when the rotor blade is split, and can be connected by corresponding connection pieces. The main direction of extent of the groove can be aligned substantially parallel to the longitudinal direction of the rotor blade. Alternatively, it is also possible for the main direction of extent of the groove to be aligned at a slope to the longitudinal axis of the rotor blade, wherein one direction component of the main direction of extent of the groove is aligned parallel to the longitudinal direction of the rotor blade, and thus the main direction of extent is not parallel to the rotor blade width. The extent of the first connection region parallel to the longitudinal direction of the rotor blade is preferably less than 25%, and/or less than 15%, and/or less than 10%, and/or less than 5%, and/or less than 1% of the longitudinal extent of the rotor blade. In particular, there is a preference for the longitudinal extent of the rotor blade to be a multiple of the extent of the first connection region. The ratio of the longitudinal extent of the rotor blade to the extent of the first connection region depends inter alia on the spar cap thickness in the connection region, the spar cap width and the spar cap material, as well as the design strain level. In the case of a longitudinal extent of the rotor blade of 70 meters, for example, an extent of the first connection region can be 1 meter.

In a preferred variant embodiment of the method, it is envisaged that the rotor blade has an outer shell, wherein the groove is made in the outer shell and in the spar cap, starting from the outer shell. The spar cap is preferably arranged on the inner side of the outer shell. The groove preferably penetrates the spar cap by less than 95%, and/or 90%, and/or 80%, and/or 70%, and/or 60%, and/or 50%, and/or 40%, and/or 30%, and/or 20%, in the direction of the spar cap thickness. Making the groove in the spar cap, starting from the outer surface, allows good accessibility of the grooves from the outside. Thus, connection pieces can be inserted into the first groove sections and second groove sections without a fitter having to get into the interior of the rotor blade.

According to another preferred variant embodiment of the method, it is envisaged that splitting, in particular splitting of the spar cap, takes place along at least one splitting plane, wherein the at least one splitting plane extends completely or in one or more sections substantially orthogonally to the longitudinal direction of the rotor blade. The splitting plane can be arranged in such a way that the longitudinal direction of the rotor blade is aligned parallel to a surface orthogonal to the splitting plane. The splitting plane aligned orthogonally to the longitudinal direction has the particular advantage that it allows quick and easy splitting of the rotor blade, especially of the spar cap. Moreover, preparatory measures are reduced since the straight splitting cut is possible without complex positioning work. Alternatively or in addition, there is a preference for the splitting plane to be aligned completely or in one or more sections at a slope to the longitudinal direction of the rotor blade. A sloping splitting plane means, in particular, that, on the one hand, the splitting plane extends in the direction of the rotor blade thickness but furthermore also in the longitudinal direction of the rotor blade and in the direction of the rotor blade thickness. The sloping splitting plane can result in improved strength of the connection point.

In particular, there is a preference for the other regions arranged in the connection region to be split or separated off before the splitting of the spar cap. As will be explained in the course of the description below, it is possible, for example, for a section which extends from the spar cap to the leading edge and/or from the spar cap to the trailing edge to be separated off, with the result that it is substantially only the spar cap and, where applicable, one or more spar webs that then have to be split.

The splitting plane is preferably arranged in the first connection region in such a way that the first groove section and the second groove section are of the same size. The same size means, in particular, that they each have the same groove section extent in the direction of the main direction of extent of the groove. However, variants in which the first and the second groove section are not of the same size are also possible. The groove can be made by means of a circular saw and/or a milling cutter, for example. During splitting, the rotor blade is preferably positioned in such a way as to produce little and/or no stress, e.g., by supporting the blade over a large area and optionally arranging and, in particular, fixing it by means of additional positioning aids.

Moreover, there is a preference for splitting to take place with a first splitting plane and with a second splitting plane, wherein the first splitting plane extends from the leading edge in the direction of the trailing edge, and the second splitting plane extends from the trailing edge in the direction of the leading edge, wherein the first splitting plane preferably merges into the second splitting plane at a transition. The first splitting plane and/or the second splitting plane can have direction components in the direction of the longitudinal extent of the spar cap and/or of the spar cap width. Splitting planes arranged in this way exhibit a splitting cut which is substantially V-shaped. It is furthermore preferred that the first splitting plane and the second splitting plane enclose a splitting angle, wherein the splitting angle is preferably greater than 30 degrees of arc and less than 180 degrees of arc, wherein the transition from the first splitting plane to the second splitting plane is at a distance from the leading edge of more than 20%, and/or 30%, and/or 40%, and/or 50%, and/or 60%, and/or 70%, and/or 80% of a rotor blade width. Such a V-shaped arrangement of the cuts is a special embodiment of the sloping splitting plane described above. In principle, this corresponds to two sloping splitting planes, which allows improved strength of a connection between the rotor blade section facing the blade root and the rotor blade section facing away from the blade root. Moreover, it is also possible for three or more splitting planes to be provided, wherein in each case two splitting planes preferably have a common point of intersection.

In particular, there may be a preference for one splitting plane not to be designed, or not to be designed completely, as a flat surface. A splitting plane can preferably have a uniform or nonuniform three-dimensional structure, it being possible, for example, for a splitting plane to be of undulating, zigzag, crenellated or sawtooth design etc.

Another preferred development of the method is distinguished by the fact that the groove has a groove width orthogonally to the main direction of extent and orthogonally to a groove depth, wherein a groove opening has a greater extent in the direction of the groove width than a groove bottom. The groove width is preferably aligned orthogonally to a groove depth and orthogonally to the main direction of extent of the groove. The groove preferably tapers from the groove opening toward the groove bottom. The profile from the groove opening to the groove bottom can assume various geometries. Said profile can be continuous and/or discontinuous, for example.

In particular, the groove can have, in a plane orthogonal to the main direction of extent, a cross section which is T-shaped and/or rectangular and/or triangular and/or trapezoidal and/or has curved edges, e.g., in the form of a hyperbola or parabola. Grooves of this kind can be advantageous with regard to the connection of a rotor blade section facing the blade root to a rotor blade section facing away from the blade root since the stop surfaces of a connection piece inserted into the groove are larger than in the case of simpler geometries.

It is furthermore preferred that a leading edge section and/or a trailing edge section is partitioned off in the first connection region, wherein the leading edge section preferably substantially comprises the section of the first connection region which extends from the spar cap to the leading edge of the rotor blade, and/or the trailing edge section preferably substantially comprises the section of the first connection region which extends from the spar cap to the trailing edge of the rotor blade. The leading edge section and/or the trailing edge section preferably do not include a section of the spar cap. In particular, there is a preference for the leading edge section to extend from the leading edge as far as an edge of the spar cap which faces the leading edge. Moreover, there is a preference for the trailing edge section to extend from the trailing edge to an edge of the spar cap which faces the trailing edge of the rotor blade.

The leading edge section and/or the trailing edge section can be partitioned off before the rotor blade, in particular the spar cap, is completely split. In the longitudinal direction and in the direction of the rotor blade width, the leading edge section and/or the trailing edge section can have a substantially rectangular geometry. Alternatively, this geometry can also be of trapezoidal or triangular design. Moreover, there may be a preference for a first front splitting point of the leading edge section to lie outside the splitting plane and/or at an end of the first connection region facing the blade root, and/or for a second front splitting point of the leading edge section to lie outside the splitting plane and/or at an end of the first connection region facing away from the blade root, and/or for a first rear splitting point of the trailing edge section to lie outside the splitting plane and/or at an end of the first connection region facing the blade root, and/or for a second rear splitting point of the trailing edge section to lie outside the splitting plane and/or at an end of the first connection region facing away from the blade root.

In a preferred variant embodiment of the method, it is envisaged that said method comprises making a second groove in the spar cap, wherein the second groove is arranged in a second connection region of the rotor blade, and the second connection region is spaced apart from the first connection region in the direction of the blade tip, in the longitudinal direction of the rotor blade, splitting the rotor blade in the second connection region into a central rotor blade section and a rotor blade section facing the blade tip, wherein a third groove section of the second groove is arranged in the central rotor blade section, and a fourth groove section of the second groove is arranged in the rotor blade section facing the blade tip.

Particularly in the case of large longitudinal extents of the rotor blade in the longitudinal direction, it may become necessary to split them twice or multiple times. In the case of erection sites with poor access in woods or in mountains, a two- or multi-part embodiment of rotor blades may be necessary. For this purpose, the arrangement of a second connection region with a second groove may be expedient, whereby a weight-saving and sufficiently strong connection is made possible in this second connection region too.

According to another aspect of the invention, provided is a method for connecting a split rotor blade, comprising providing a split rotor blade produced by a method in accordance with at least one of the variant embodiments described above, arranging and connecting in a materially integral manner, in particular by means of an adhesive bonding method, a connection piece to the first groove section and to the second groove section.

The arrangement of the connection piece can also comprise arranging and aligning the rotor blade section facing the blade root and the rotor blade section facing away from the blade root. The two rotor blade sections are preferably arranged in such a way that the two rotor blade sections arranged have the target contour of the rotor blade. It follows from this inter alia that the first groove section and the second groove section are arranged directly against one another and that the connection piece can be arranged in the first groove section and in the second groove section. A gap between the two rotor blade sections is preferably made as small as possible.

A preferred variant embodiment of the method for connecting a split rotor blade envisages that a spar cap section of the spar cap facing the blade root and a spar cap section of the spar cap facing away from the blade root have an additional connection in addition to the connection piece. In particular, there is a preference for the additional connection to be arranged on a spar cap inside of the spar cap or of the spar cap section facing the blade root and of the spar cap section facing away from the blade root, wherein the inside of the spar cap faces the interior of the rotor blade. There is furthermore a preference for the additional connection to be arranged in the region of the openly accessible leading and trailing edges.

The arrangement and materially integral connection of the connection piece to the first groove section and to the second groove section preferably comprises cleaning and/or roughening the connection surfaces. As an alternative or in addition, the connection surfaces can be prepared by sandblasting and/or by grinding and/or by peel-off fabrics. Materially integral connection can be accomplished with a structural adhesive, which, in particular, is built up on the basis of epoxy resin and/or polyurethane. The connection piece can comprise plastic or can be composed of plastic. In particular, there is a preference for this plastic to be a glass-fiber-reinforced plastic, wherein a pultruded glass-fiber-reinforced plastic is preferred. Moreover, the plastic can also be a carbon-fiber-reinforced plastic, wherein, here too, a pultruded carbon-fiber-reinforced plastic is preferred. In order to satisfy the high strength requirements in the first connection region and/or the second connection region, fibers of the connection piece can be aligned parallel to the main direction of extent of the groove. Moreover, the fibers can be aligned parallel to the main force direction in the first and/or the second connection region. Furthermore, the fibers can be aligned substantially parallel to the longitudinal direction of the rotor blade and/or parallel to the longitudinal extent of the spar cap.

Moreover, there is a preference for the method to comprise arranging and adhesively bonding respective connection pieces in the third groove section and in the fourth groove section. The method for connecting the split rotor blade can furthermore comprise alignment and set up on the leading edge or trailing edge of the rotor blade. Set up on the leading edge or trailing edge of the rotor blade has the particular advantage that grooves on the suction side and on the pressure side of the rotor blade are easily accessible for a fitter.

The connection piece can also have through holes which are arranged and designed for fixing the connection piece in the first groove section and in the second groove section, e.g., by means of fastening elements. Such fixing allows repeatable arrangement of a plurality of connection pieces, thus ensuring, for example, that an adhesive layer between the groove and the connection piece is substantially uniform. In particular, the connection piece can thus also be arranged by less experienced fitters without a loss of quality in the connection point. Moreover, the through holes can also be arranged and designed for ventilation.

In a preferred variant embodiment of the method for connecting a split rotor blade, it is furthermore envisaged that the geometry of the connection piece is designed to correspond to the geometry of the groove. A geometry of the connection piece corresponding to the groove geometry means, in particular, that the geometry of the groove corresponds substantially to the geometry of the connection piece. In general, the cross section of the connection piece will have slightly smaller dimensions than the cross section of the groove. Thus, it is ensured that the connection piece can be arranged in the groove and furthermore that a connection means, e.g., an adhesive, can be arranged between the connection piece and the groove boundary surfaces. Moreover, there is a preference for the groove and the connection piece to be designed in such a way that the connection piece ends flush with the outer skin of the rotor blade in order to achieve aerodynamic advantages.

Another preferred development of the method for connecting a split rotor blade is characterized in that a section of the connection piece which faces the groove bottom has a partially circular geometry. This partially circular geometry can extend in the direction of the groove width and/or in the main direction of extent of the groove, for example. Moreover, the groove can extend from a first end to a second end in the main direction of extent and, in the section which faces the groove bottom, can extend with a concave geometry between the first end and the second end. This variant embodiment describes a groove which has a smaller groove depth at its first end and at its second end than between these ends. Such a groove geometry is produced by the penetration of a circular saw blade, for example.

In another preferred variant embodiment of the method for connecting a split rotor blade, it is envisaged that the cross section of the connection piece is adapted to the cross section of the groove and/or corresponds thereto. Moreover, there is a preference for the connection piece to extend from a first end to a second end, wherein this extent corresponds to the main direction of extent of the connection piece and, when the connection piece is inserted into the groove, the main direction of extent of the connection piece is aligned substantially parallel to the main direction of extent of the groove. Moreover, the connection piece can be rounded and/or beveled in a section adjoining its first end and/or in a section adjoining its second end, thus reducing possible notch stresses.

Another preferred development of the method for connecting a split rotor blade is characterized in that the connection piece is inserted into the groove with one, two or more spacer elements, wherein the spacer elements can be designed as plastic clips and/or film strips and/or adhesive tape.

There is furthermore a preference for the method for connecting a split rotor blade to comprise the steps of producing a connection at a splitting point of a web, and/or producing a connection at a first splitting point and/or at a second splitting point of a leading edge section, and/or producing a connection at a splitting point of a trailing edge section.

The connections at the webs and/or at the leading-edge and trailing-edge sections can be produced conventionally by beveling. In contrast to the spar cap, there are generally no unidirectionally aligned fibers arranged in these regions, biaxial and/or triaxial non-crimped fabrics being provided instead, for example. By virtue of such non-crimped fabrics, the first and/or second connection regions are smaller than in the case of regions with unidirectionally aligned fibers. Moreover, the forces and/or other loads acting here are smaller, wherein shear loads occur here, in particular. The lightning protection connection or electrical contacting at the webs is generally an additional process.

To connect the rotor blade section facing the blade root to the rotor blade section facing away from the blade root, these are preferably supported in a stress-free manner and aligned and calibrated in such a way that together they correspond substantially to the target contour of the rotor blade. The arrangement of the connection piece is performed, in particular, taking into account the required climatic conditions, wherein the air humidity and the minimum and maximum temperature are allowed for, for example. The connection can be made, for example, in an air conditioned environment, in particular an air conditioned mobile tent or container, wherein the mobile tent or the mobile container can provide an air conditioned environment, at least for the connection region. Moreover, the groove and the connection piece can be roughened and cleaned. Alternatively or in addition, this can also be accomplished by means of sand-blasting or peel-off fabric.

The groove is preferably filled completely with an adhesive, in particular a structural adhesive, e.g., one based on epoxy resin or polyurethane, and the connection piece is then arranged in the groove. The connection piece preferably has the spacer elements described above, which improve the quality of the adhesive joint and/or allow centering of the connection piece in the groove. The spacer elements can be designed as plastic clips, films or adhesive tapes, for example. In addition, the connection piece can be fixed in its position by means of screws, in particular self-tapping screws, thus ensuring that this position substantially does not change during a subsequent curing process. The web facing the blade root and the web facing away from the blade root are optionally connected to one another by means of a web connector, wherein the web connector preferably has a c-shaped profile. In addition, the sections between the spar cap and the leading edge and/or between the spar cap and the trailing edge can be closed by means of a leading edge section and/or a trailing edge section. This can be accomplished by means of adhesive bonding using beveled edge regions, for example.

Moreover, there is a preference for the adhesive to be heated and cured, wherein additional laminates are also used or heated and cured. Furthermore, surface preparation, comprising grinding and/or filling, for example, can be performed, particularly on an outer side of the outer shell of the rotor blade. It is also possible for the rotor blade to be painted and/or coated, particularly in the connection region, thus preferably creating a uniform appearance of the rotor blade by means of this application of color.

According to another aspect of the invention, provided is a rotor blade having a spar cap, comprising a rotor blade section facing the blade root and a rotor blade section facing away from the blade root, which are arranged one against the other in a first connection region, wherein the spar cap has a groove in the first connection region, wherein a first groove section is arranged in the rotor blade section facing the blade root, and a second groove section is arranged in the rotor blade section facing away from the blade root, and a connection piece is arranged in the first groove section and in the second groove section by means of a materially integral method, in particular an adhesive bonding method.

The rotor blade preferably has an extent in the longitudinal direction from a blade root region to a blade tip. The groove is preferably characterized in that it has a main direction of extent that has a direction component which is aligned parallel to the longitudinal direction of the rotor blade. It is preferable if a first groove section is arranged in the rotor blade section facing the blade root and a second groove section of the groove is arranged in the rotor blade section facing away from the blade root. Moreover, the rotor blade can have an outer shell, on the inner side of which the spar cap is preferably arranged, wherein the groove extends through the outer shell and into the spar cap, starting from the outer shell. The groove preferably does not extend completely through the spar cap, and therefore the groove has a groove bottom which is arranged within the spar cap.

The groove preferably has a groove width orthogonally to the main direction of extent and orthogonally to the groove depth, wherein a groove opening has a greater extent in the direction of the groove width than the groove bottom. The groove can preferably have a T-shaped and/or rectangular and/or triangular and/or trapezoidal cross section. In particular, there is a preference for the connection piece to have a geometry which corresponds to the groove, and therefore the connection piece can also have a T-shaped and/or rectangular and/or triangular and/or trapezoidal geometry. The rotor blade can furthermore have a second connection region having a second groove, wherein the second connection region is spaced apart from the first connection region in the direction of the blade tip or in the direction of the blade root region, in the longitudinal direction of the rotor blade.

According to another aspect of the present invention, provided is a rotor blade segment having a connection subregion for connection to at least one further rotor blade segment having a corresponding connection subregion, comprising a spar cap, wherein the connection subregion has a groove section in the spar cap for the arrangement of a connection piece.

The rotor blade segments can be designed either as rotor blade segments facing away from the blade root or as rotor blade segments facing the blade root. The rotor blade segments are preferably manufactured in such a way that a rotor blade segment facing the blade root and a rotor blade segment facing away from the blade root can be arranged one against the other and can be connected to one another by the method for connecting a split rotor blade. In particular, the connection subregions of the rotor blade segments are arranged one against the other and designed for connection. Accordingly, the features, described above, of the method for connecting a split rotor blade and connecting the rotor blade to a spar cap for the rotor blade segments apply analogously with the appropriate changes. According to another aspect of the present invention, provided is a rotor blade comprising a rotor blade segment facing the blade root and having a first groove section and comprising a rotor blade segment facing away from the blade root and having a second groove section, wherein a connection piece is arranged in the first groove section and the second groove section by means of a materially integral method, in particular adhesive bonding. It is thus possible for two rotor blade segments to be manufactured independently of one another and then connected to one another by means of the connection pieces at the erection site of a wind power installation.

According to another aspect of the present invention, provided is a rotor for a wind power installation comprising at least one rotor blade produced by at least one of the methods for producing a split rotor blade and for connecting a split rotor blade, and/or a rotor blade in accordance with the preceding aspect, and/or two rotor blade segments in accordance with the preceding aspect, connected by means of a connection piece.

According to another aspect of the present invention, provided is a wind power installation comprising a rotor in accordance with the preceding aspect.

Moreover, provided is a production system for producing rotor blades from a rotor blade section facing the blade root and a rotor blade section facing away from the blade root, and/or from a rotor blade segment facing the blade root and a rotor blade segment facing away from the blade root, comprising a first container and a second container, wherein at least one of the containers comprises a device for aligning the rotor blade sections and/or rotor blade segments, wherein the containers are arranged and designed in such a way that a rotor blade section facing the blade root and a rotor blade section facing away from the blade root, and/or a rotor blade segment facing the blade root and a rotor blade segment facing away from the blade root, can be connected for connection by at least one of the methods for connecting a split rotor blade. On the one hand, a production system of this kind satisfies the mobility requirements but, at the same time, it can satisfy the high climatic demands on materially integral connection, e.g., atmospheric humidity, and minimum and maximum temperature.

For further advantages, variant embodiments and embodiment details of these further aspects and the possible developments thereof, attention is also drawn to the description given above of the corresponding features and developments of the method for producing a split rotor blade and of the method for connecting a split rotor blade.

BRIEF DESCRIPTION OF THE SEVERAL VIEWS OF THE DRAWINGS

Preferred embodiments of the invention are explained by way of example with reference to the accompanying figures, of which:

FIG. 9 shows a schematic detail view of an alternative connection region of the rotor blade shown in FIG. 2;

FIG. 10 shows a schematic detail view of another alternative connection region of the rotor blade shown in FIG. 2.

DETAILED DESCRIPTION

In the figures, elements that are identical or substantially functionally identical or functionally similar are denoted by the same reference signs.

Figure 1:
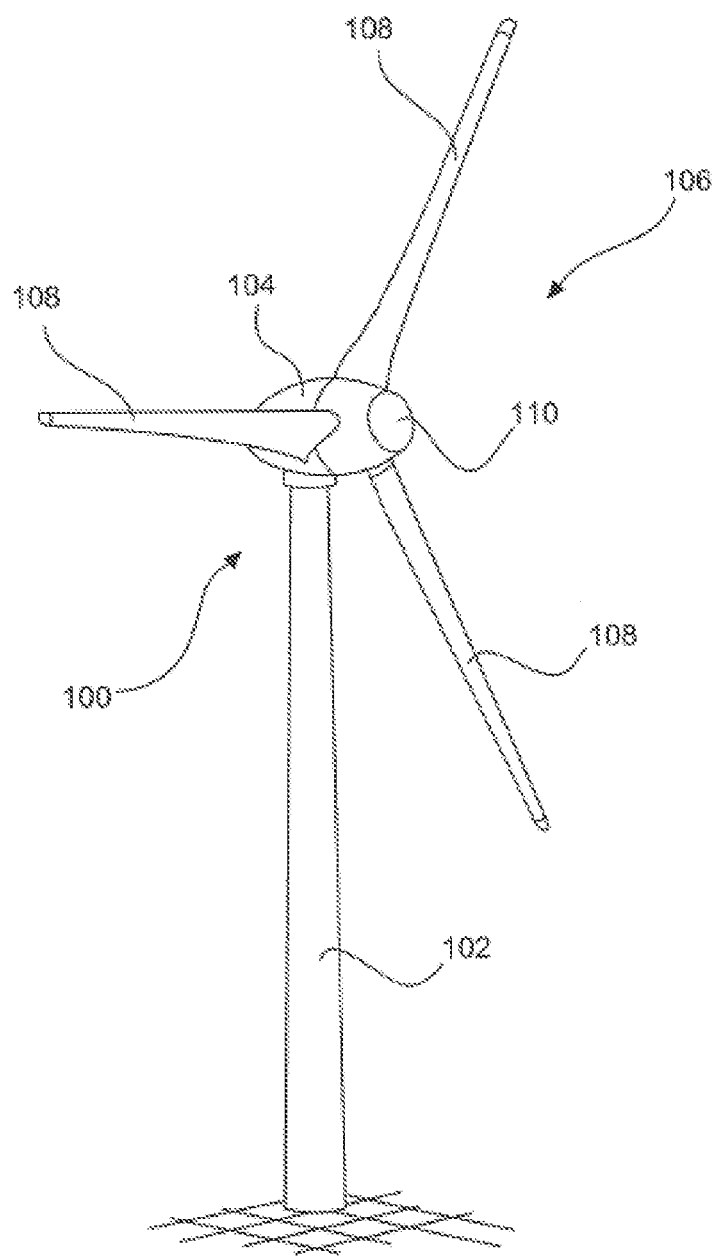
FIG. 1 shows a schematic view of an illustrative embodiment of a wind power installation.

FIG. 1 shows a schematic three-dimensional view of an illustrative embodiment of a wind power installation. In particular, FIG. 1 shows a wind power installation 100 having a tower 102 and a nacelle 104. A rotor 106 having three rotor blades 108 and a spinner 110 is arranged on the nacelle 104. In operation, the rotor 106 is set in rotation by the wind, and thereby drives a generator on the nacelle 104. The rotor blades 108 are produced by the method for producing a split rotor blade and the method for connecting a split rotor blade, and therefore the rotor blades 108 have a rotor blade section facing the blade root and a rotor blade section facing away from the blade root.

Figure 2:
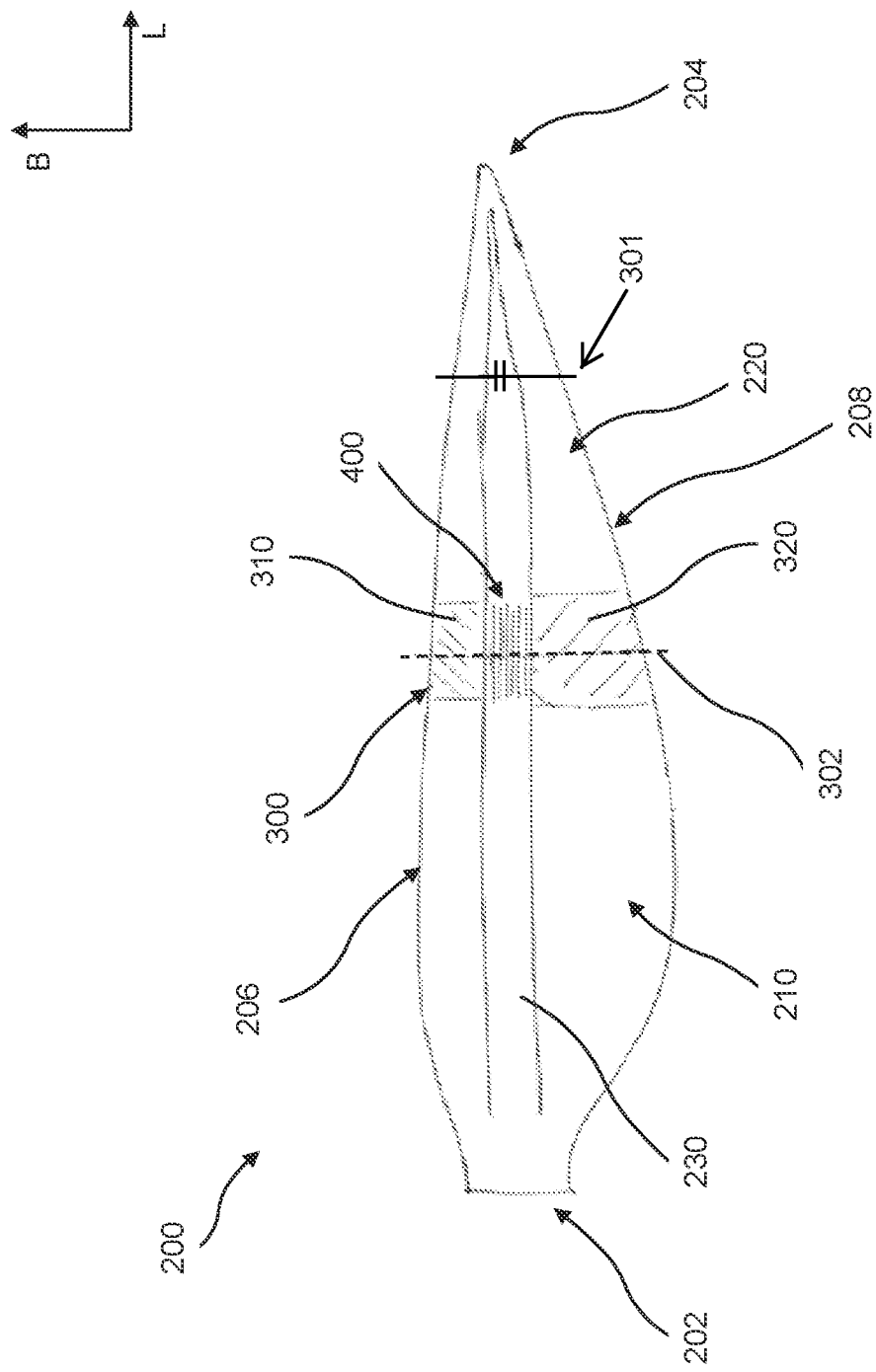
FIG. 2 shows a schematic plan view of an illustrative embodiment of a rotor blade.

FIG. 2 shows a schematic plan view of an illustrative embodiment of a rotor blade. The rotor blade 200 extends in the longitudinal direction L from a blade root region 202 to a blade tip 204. A spar cap 230 furthermore extends from the blade root region 202 substantially as far as the blade tip 204. The rotor blade has a sheet-like extent, which is formed by an extent in the longitudinal direction L and in the direction of the width B. The rotor blade 200 has a leading edge 206 and a trailing edge 208, which are aligned substantially parallel to the longitudinal direction L. In the present case, this is a rotor blade to be split, wherein grooves 400 have already been made in the spar cap, but the rotor blade has not yet been split along the splitting plane 302.

Between the blade root region 202 and the blade tip 204, the rotor blade 200 has a first connection region 300. The first connection region 300 is, in particular, the section of the rotor blade 200 in which the splitting plane 302, the grooves 400, as well as the leading edge section 310 and the trailing edge section 320 are arranged. Splitting the rotor blade 200 along the splitting plane 302 gives rise to a rotor blade section 210 facing the blade root and a rotor blade section 220 facing away from the blade root.

FIG. 2 shows a second connection region 301.

Figure 3:
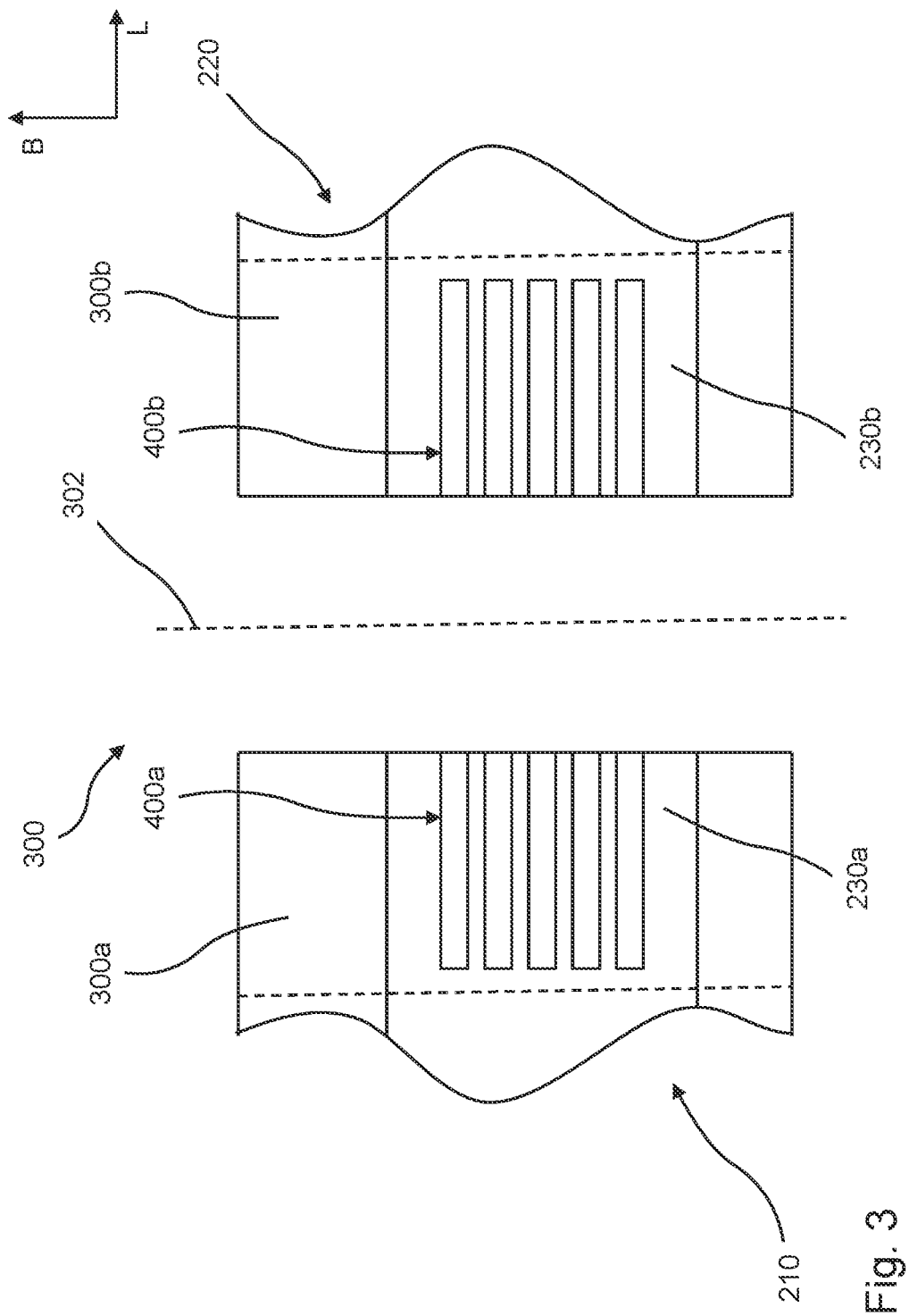
FIG. 3 shows a schematic detail view of the connection region of the rotor blade shown in FIG. 2.

The first connection region 300 of the rotor blade 200, which is illustrated in more detail in FIG. 3, comprises the grooves 400. In the present case, the grooves 400 have a main direction of extent which is aligned parallel to the longitudinal direction L of the rotor blade. Once the rotor blade has been split at the splitting plane 302, the first connection region 300 is split into a connection region section 300a facing the blade root and a connection region section 300b facing away from the blade root. Owing to the split, the connection region section 300a facing the blade root is arranged on the rotor blade section 210 facing the blade root. Owing to the split, the connection region section 300b facing away from the blade root is arranged on the rotor blade section 220 facing away from the blade root.

By virtue of the split along the splitting plane 302, the grooves 400 have furthermore been split into first groove sections 400a and into second groove sections 400b. The first groove sections 400a are arranged on the rotor blade section 210 facing the blade root, and the second groove sections 400b are arranged on the rotor blade section 220 facing away from the blade root. Owing to the splitting of the rotor blade 200, the spar cap 230 is also split into a spar cap section 230a facing the blade root and a spar cap section 230b facing away from the blade root. This splitting of the spar cap 230 causes weakening of the strength of the rotor blade 200 in the longitudinal direction L. For this purpose, the grooves 400 or the first groove sections 400a and the second groove sections 400b are provided. The rotor blade section 210 facing the blade root and the rotor blade section 220 facing away from the blade root can be connected firmly to one another by inserting connection pieces of the kind described below into the groove sections 400a, 400b. The connection pieces are preferably adhesively bonded into the groove sections 400a, 400b, with the result that force flows from the rotor blade section 220 facing away from the blade root via the connection pieces to the rotor blade section 210 facing the blade root.

Figure 4:
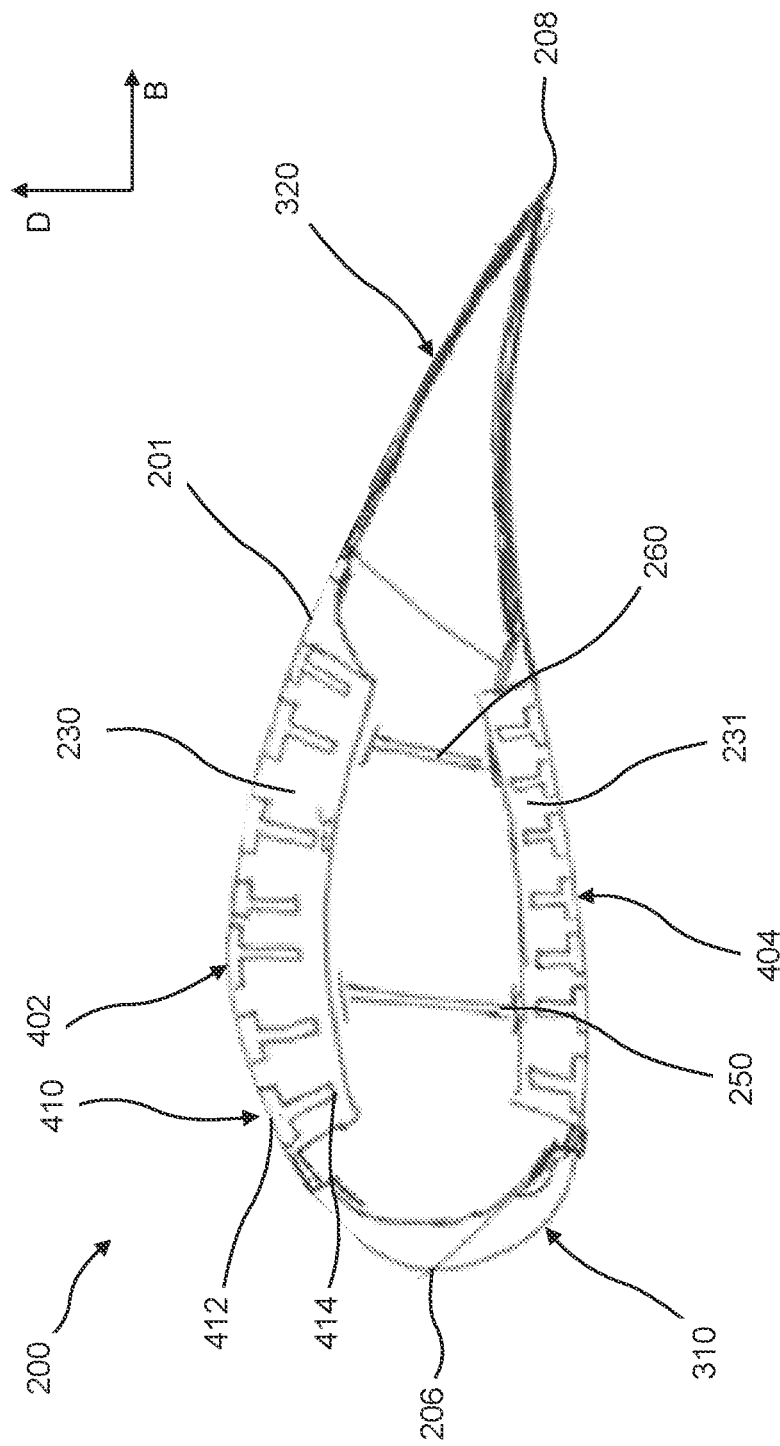
FIG. 4 shows a schematic cross-sectional view of the rotor blade shown in FIG. 2.

The view shown in FIG. 4 has a direction of view aligned parallel to the longitudinal direction L of the rotor blade. The rotor blade 200 has a suction-side spar cap 230 and a pressure-side spar cap 231. The two spar caps 230, 231 are connected to one another by means of a front web 250, which faces the leading edge 206, and of a rear web 260, which faces away from the leading edge 206. The rotor blade 200 is substantially encased by an outer shell 201. The spar caps 230, 231 are arranged on the inner sides of the outer shell 201. Grooves 402 facing the suction side are arranged in the suction-side spar cap 230. Grooves 404 facing the pressure side are arranged in the pressure-side spar cap 231. In this illustrative embodiment, the grooves 402, 404 have a T-shaped cross section. This is shown by way of example by means of the first groove 410 since said groove has a groove opening 412 that has a greater extent than a groove bottom 414.

The leading edge section 310 is arranged between the leading edge 206 and the spar caps 230, 231 in the first connection region. It is possible, for example, for the leading edge section 310 to be removed before the complete splitting of the rotor blade 200 in the region of the splitting plane 302. The section of the first connection region 300 between the trailing edge 208 and the spar caps 230, 231 is formed by the trailing edge section 320, which can likewise be removed before the rotor blade 200 is split at the splitting plane 302. In this case, the leading edge section 310 and/or the trailing edge section 320 are/is not split along the splitting plane 302.

Figure 5:
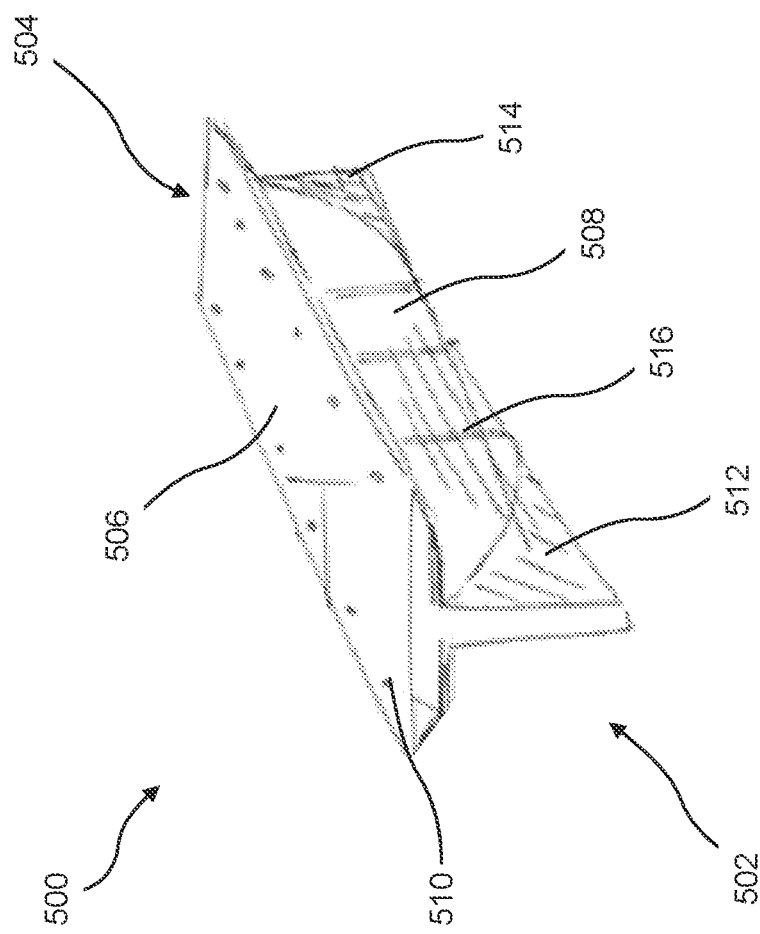
FIG. 5 shows a schematic three-dimensional view of an illustrative embodiment of a connection piece.

FIG. 5 shows a schematic three-dimensional view of an illustrative embodiment of a connection piece. The connection piece 500 extends from a first end 502 to a second end 504. The connection piece 500 has a T-shaped cross section. The T-shaped cross section is formed by the fact that the connection piece 500 has a sheet-like holding section 506 and a sheet-like insertion section 508 arranged orthogonally to the surface thereof. The insertion section 508 is arranged centrally on a sheet-like extent of the holding section 506, thus giving rise to the T-shaped cross section.

The connection piece 500 furthermore has a plurality of connection piece openings 510 in the holding section 506. In particular, the connection piece openings 510 are arranged and designed in such a way that they can be used with a fastening element for fixing and/or for ventilation. In particular, the connection piece openings 510 can be designed in such a way that self-tapping screws can be arranged therein, wherein fixing of the connection piece 500 in the groove is made possible by means of the screws. Moreover, the connection piece 500 has three spacer elements 516, by means of which a defined spacing can be ensured between the connection piece 500 and a groove, in particular a groove bottom. Four or more spacer elements 516 can furthermore be installed.

A first cut-off surface 512 and a second cut-off surface 514 are illustrated with hatching. The connection piece can be produced without the first cut-off surface 512 and/or without the second cut-off surface 514, for example. The connection piece 500 thus has a partially circular geometry in the section which faces the groove bottom. This makes it possible, for example, to insert the connection piece into a groove that has been produced by means of a circular saw blade.

Figure 6:
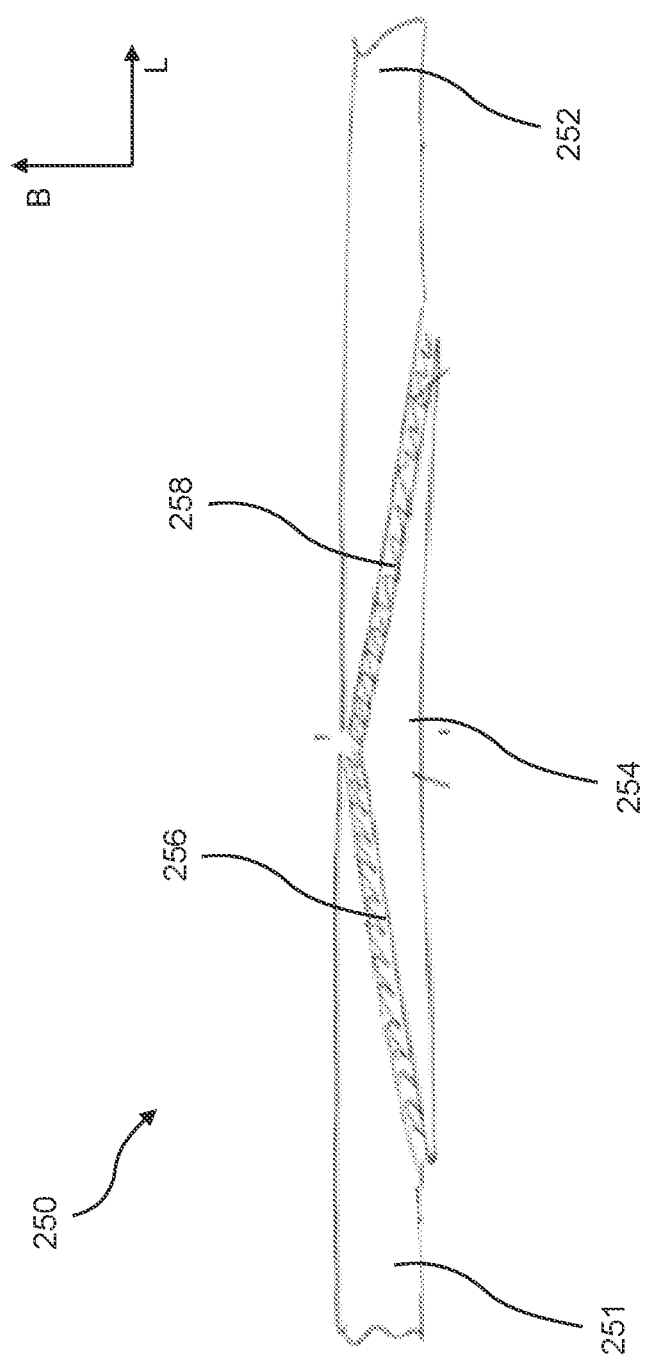
FIG. 6 shows a schematic view of a split web of a rotor blade shown in FIG. 2.
Figure 7:
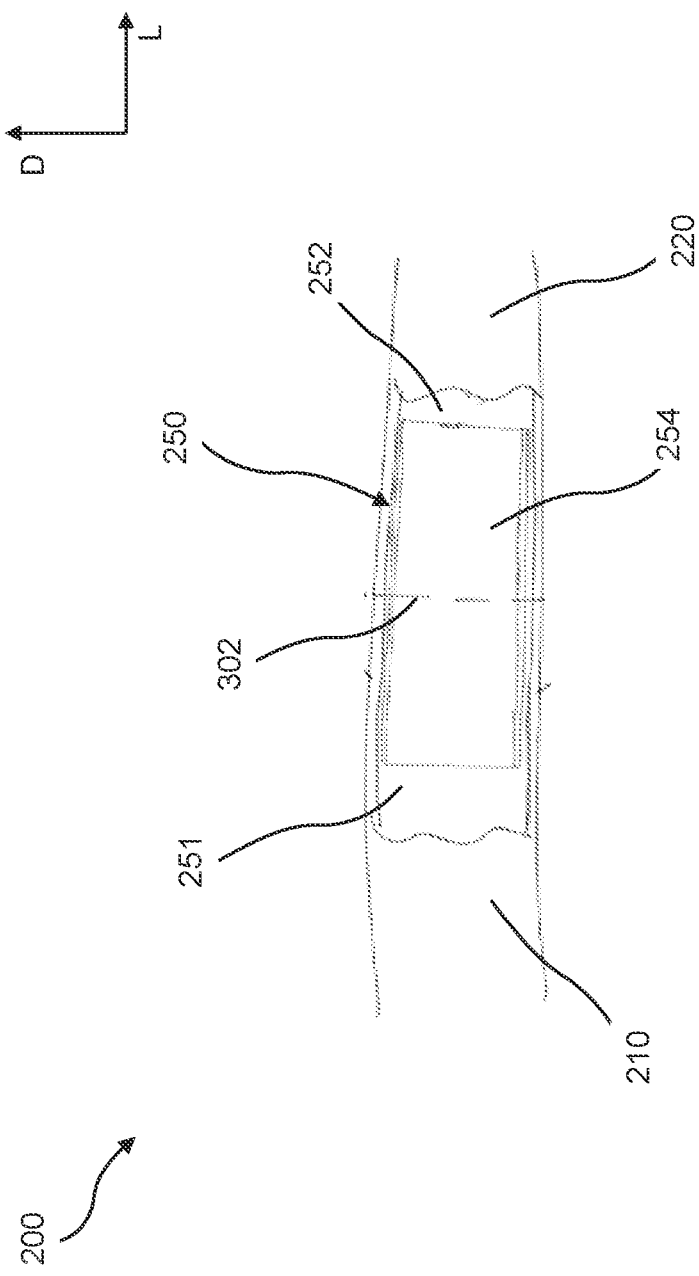
FIG. 7 shows another schematic view of the split web of the rotor blade shown in FIG. 2.
Figure 8:
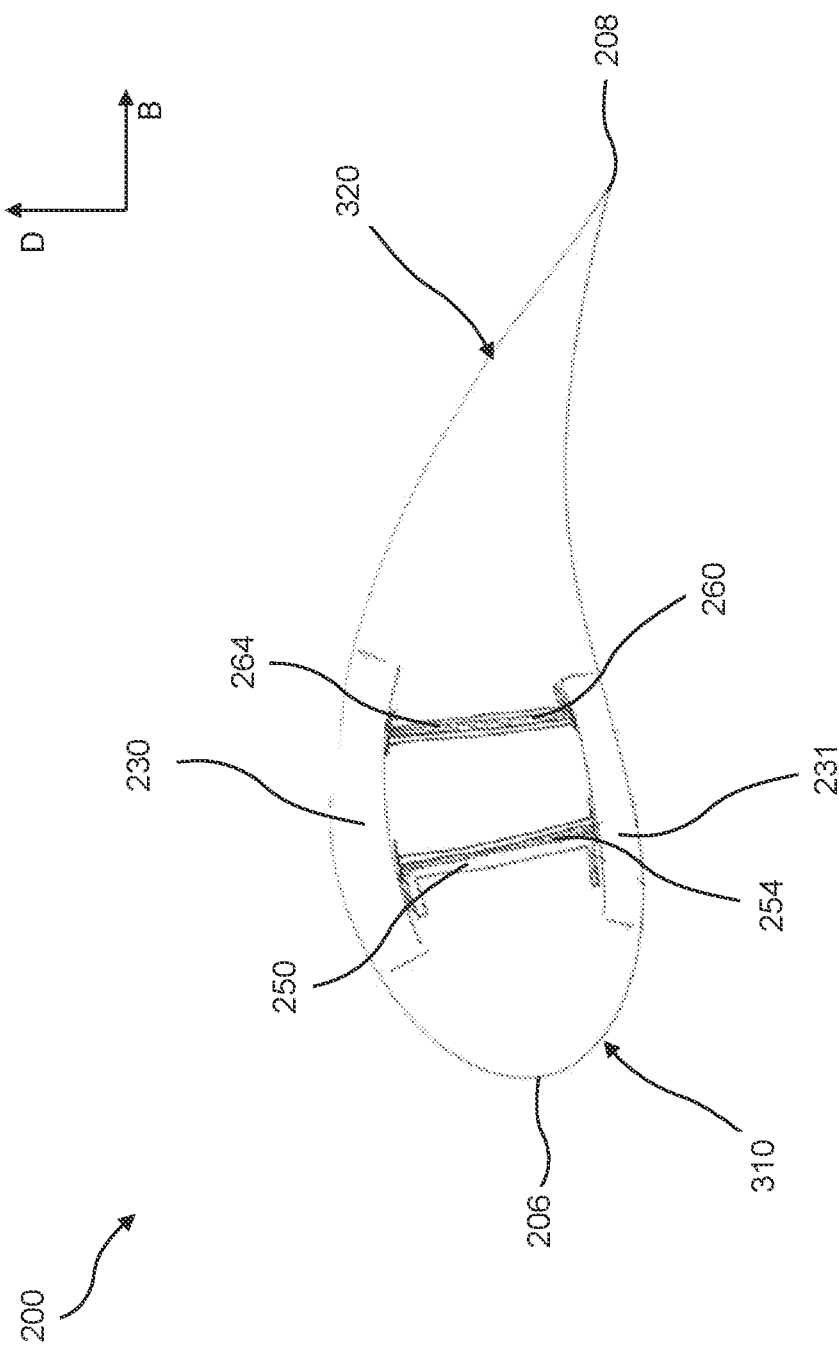
FIG. 8 shows another schematic cross-sectional view of the rotor blade shown in FIG. 2.

FIGS. 6 and 7 show the connection of a split web 250, wherein a web connection piece 254 is used to connect the web section 251 facing the blade root to the web section 252 facing away from the blade root. This is also accomplished by means of adhesive bonding on a first connection surface 256 and a second connection surface 258, for example. FIG. 8 shows another schematic cross-sectional view, which shows the spar caps 230, 231 in greatly simplified form, without the grooves being visible. The web connection pieces 254, 264 are furthermore embodied in a C profile which has an extent in the direction of the thickness D between the spar caps 230, 231 and furthermore has extensions substantially in the direction of the width B. The web connection pieces 254, 264 are designed in such a way that an extension rests against the pressure-side spar cap 231 and another extension rests against the suction-side spar cap 231.

Alternative designs of the splitting plane 302 are illustrated in FIGS. 9 and 10. The splitting cut shown in FIG. 9 has a V-shaped geometry. In particular, the splitting cut has a first splitting plane 302a' and a second splitting plane 302b', wherein the selected angle α enclosed by the first and second splitting planes 302a', 302b' can be any angle between less than 360 degrees of arc, in particular less than 180 degrees of arc, and greater than 0 degrees of arc. The production of such first and second splitting planes 302a', 302b' can also be referred to as an arrow-shaped sawcut. A plurality of splitting planes 302" shown in FIG. 10 has a wavy or undulating splitting plane. Moreover, it is also possible for a plurality of splitting planes to have a crenellated or sawtooth profile. These splitting planes 302a', 302b', 302" of alternative design can improve the strength in the connection region 300', 300". In particular, a positive-locking connection of the rotor blade sections can be formed in respect of torsion.

Splitting into a spar cap section 230a facing the blade root and a spar cap section 230b facing away from the blade root, which is illustrated in FIGS. 9 and 10, is also possible in variants in which the splitting planes are arranged as a mirror image. This would correspond to schematic illustrations in which the spar cap sections facing the blade root and those facing away from the blade root are interchanged.

Through the production of a split rotor blade 200 having a first connection region 300, 300', 300", wherein grooves 400 are arranged in the region of a spar cap 230 and the rotor blade 200 is split along the splitting plane 302, 302', 302" in the first connection region 300, 300', 300", it is possible to provide a rotor blade 200 that can be transported in an advantageous manner. Through the connection of the rotor blade section 210 facing the blade root and of the rotor blade section 220 facing away from the blade root, e.g., at an erection side of a wind power installation 100, by means of connection pieces 500 inserted into the grooves 400, it is possible to provide a particularly weight-saving or neutral-weight connection of a split rotor blade 200. By means of the special arrangement of the grooves 400 in the first connection region 300, 300', 300" or in the spar cap 230 and the adhesive bonding of at least one connection piece 500, preferably a multiplicity of connection pieces, into the grooves 400, a connection that ensures strength can be achieved.

By virtue of the connection of two rotor blade sections, the weight of a rotor blade that is split in two can be kept so low that the weight thereof is comparable to the weight of a one-piece rotor blade. This type of splitting does not have a load-increasing effect on the rotor blade and the other components of the wind power installations due to a higher weight. Moreover, the connection is substantially maintenance-free.

REFERENCE SIGNS 100 wind power installation
102 tower
104 nacelle
106 rotor
108, 200 rotor blade
110 spinner
201 outer sleeve
202 blade root region
204 blade tip
206 leading edge
208 trailing edge
210 rotor blade section facing the blade root
220 rotor blade section facing away from the blade root
230 suction-side spar cap
230a spar cap section facing the blade root
230b spar cap section facing away from the blade root
231 pressure-side spar cap
250 front web
251 web section facing the blade root
252 web section facing away from the blade root
254, 264 web connection piece
256 first connection surface
258 second connection surface
260 rear web 300, 300', 300" first connection region
300a connection region section facing the blade root
300b connection region section facing away from the blade root
302, 302a', 302b', 302" splitting plane
310 leading edge section
320 trailing edge section
400 grooves
400a first groove sections
400b second groove sections
402 grooves facing the suction side
404 grooves facing the pressure side
410 first groove
412 groove opening
414 groove bottom
500 connection piece
502 first end
504 second end
506 holding section
508 insertion section
510 connection piece opening
512 first cut-off surface
514 second cut-off surface
516 spacer element
B width
D thickness
L length

The invention claimed is:

1. A method for producing a split rotor blade, comprising: the split rotor blade having:
 a spar cap, and
 an extent in a longitudinal direction from a blade root region to a blade tip, the method comprising:
 forming at least one groove in the spar cap, wherein the at least one groove is arranged in a first connection region of the rotor blade at at least one splitting plane, wherein the rotor blade has not yet been split apart along the at least one splitting plane, and
 splitting the rotor blade along the at least one splitting plane in the first connection region into a rotor blade section facing the blade root and a rotor blade section facing away from the blade root, wherein a first groove section is arranged in the rotor blade section facing the blade root and a second groove section is arranged in the rotor blade section facing away from the blade root,
 wherein the at least one groove has a cross section, in a plane orthogonal to the extent in the longitudinal direction of the rotor blade, that is T-shaped.

2. The method as claimed in claim 1, wherein the rotor blade has an outer shell, wherein the at least one groove is in the outer shell and in the spar cap starting from the outer shell.

3. The method as claimed in claim 1, wherein the at least one splitting plane:
 extends orthogonally to the longitudinal direction of the rotor blade, and
 is aligned at a slope to the longitudinal direction of the rotor blade.

4. The method as claimed in claim 1, wherein the at least one groove has a groove width orthogonally to the main direction of extent and orthogonally to a groove depth, wherein a groove opening has a greater extent in a direction of the groove width than a groove bottom.

5. The method as claimed in claim 1, wherein at least one of: a leading edge section or a trailing edge section is split before the spar cap of the rotor blade is split,
 wherein the leading edge section includes a section of the first connection region extending from the spar cap to the leading edge of the rotor blade, and wherein the trailing edge section includes a section of the first connection region extending from the spar cap to the trailing edge of the rotor blade.

6. The method as claimed in claim 1, wherein the at least one splitting plane is a plurality of splitting planes.

7. The method as claimed in claim 1, wherein the at least one groove is a first groove, the method comprising:
 forming a second groove in the spar cap, wherein:
 the second groove is arranged in a second connection region of the rotor blade, and
 the second connection region is spaced apart from the first connection region in the direction of the blade tip in the longitudinal direction of the rotor blade, and
 splitting of the rotor blade in the second connection region into a central rotor blade section and a rotor blade section facing the blade tip, wherein a third groove section of the second groove is arranged in the central rotor blade section, and a fourth groove section of the second groove is arranged in the rotor blade section facing the blade tip.

8. A method for connecting a split rotor blade, comprising:
 providing a split rotor blade produced by the method as claimed in at claim 1, and
 adhesively bonding a connection piece to the first groove section and to the second groove section.

9. The method as claimed in claim 8, wherein a shape of the connection piece corresponds to a shape of the first and second groove sections.

10. The method as claimed in claim 8, wherein a cross section of the connection piece corresponds to a cross section of the groove.

11. The method as claimed in claim 6, wherein the plurality of splitting planes together form a triangular shape.

12. The method as claimed in claim 6, wherein the plurality of splitting planes together form a wavy shape.

13. The method as claimed in claim 6, wherein each splitting plane of the plurality of splitting planes extends in different directions as each other.

* * * * *